United States Patent [19]

Beavers et al.

[11] 4,119,874
[45] Oct. 10, 1978

[54] BEARING ARRANGEMENT FOR ELONGATED ELECTRIC MOTORS

[75] Inventors: John Andrew Beavers; Billy O. Dillion, both of Tulsa, Okla.

[73] Assignee: Borg-Warner Corporation, Chicago, Ill.

[21] Appl. No.: 767,931

[22] Filed: Feb. 11, 1977

[51] Int. Cl.² ............................................. H02K 5/12
[52] U.S. Cl. ...................................... 310/90; 310/114; 308/26
[58] Field of Search ..................... 310/90, 87, 65, 112, 310/88, 114, 91, 168, 169, 170; 308/72, 78, 163, 26, DIG. 11

[56] References Cited

U.S. PATENT DOCUMENTS

| | | | |
|---|---|---|---|
| 1,464,386 | 8/1923 | Ingram | 308/DIG. 11 |
| 2,315,917 | 4/1943 | Arutunoff | 310/87 |
| 2,781,464 | 2/1957 | Timms | 310/90 |
| 3,136,905 | 6/1964 | Zapf | 310/87 |
| 3,506,861 | 8/1966 | Boyd | 310/90 |
| 3,551,714 | 12/1970 | Boyd | 310/90 |
| 3,823,991 | 7/1974 | Lamperski | 308/73 |
| 3,980,352 | 9/1976 | Carlson | 308/73 |
| 4,006,659 | 2/1977 | Wurzel | 308/DIG. 11 |

FOREIGN PATENT DOCUMENTS 155,633  12/1920  United Kingdom ........... 308/DIG. 11

Primary Examiner—R. Skudy
Attorney, Agent, or Firm—Aubrey L. Burgess

[57] ABSTRACT

An elongated electric motor having an annular stator comprising a plurality of magnetic laminations and a rotor on a shaft comprising a plurality of segments in said stator with a plurality of bearing means supporting said shaft and rotor, the bearing means including journal portions adjacent the stator with a groove therein in which a spring is disposed. The spring frictionally engages the stator and the bearings and prevents rotation of the bearing because of the magnetic field of the stator.

5 Claims, 3 Drawing Figures

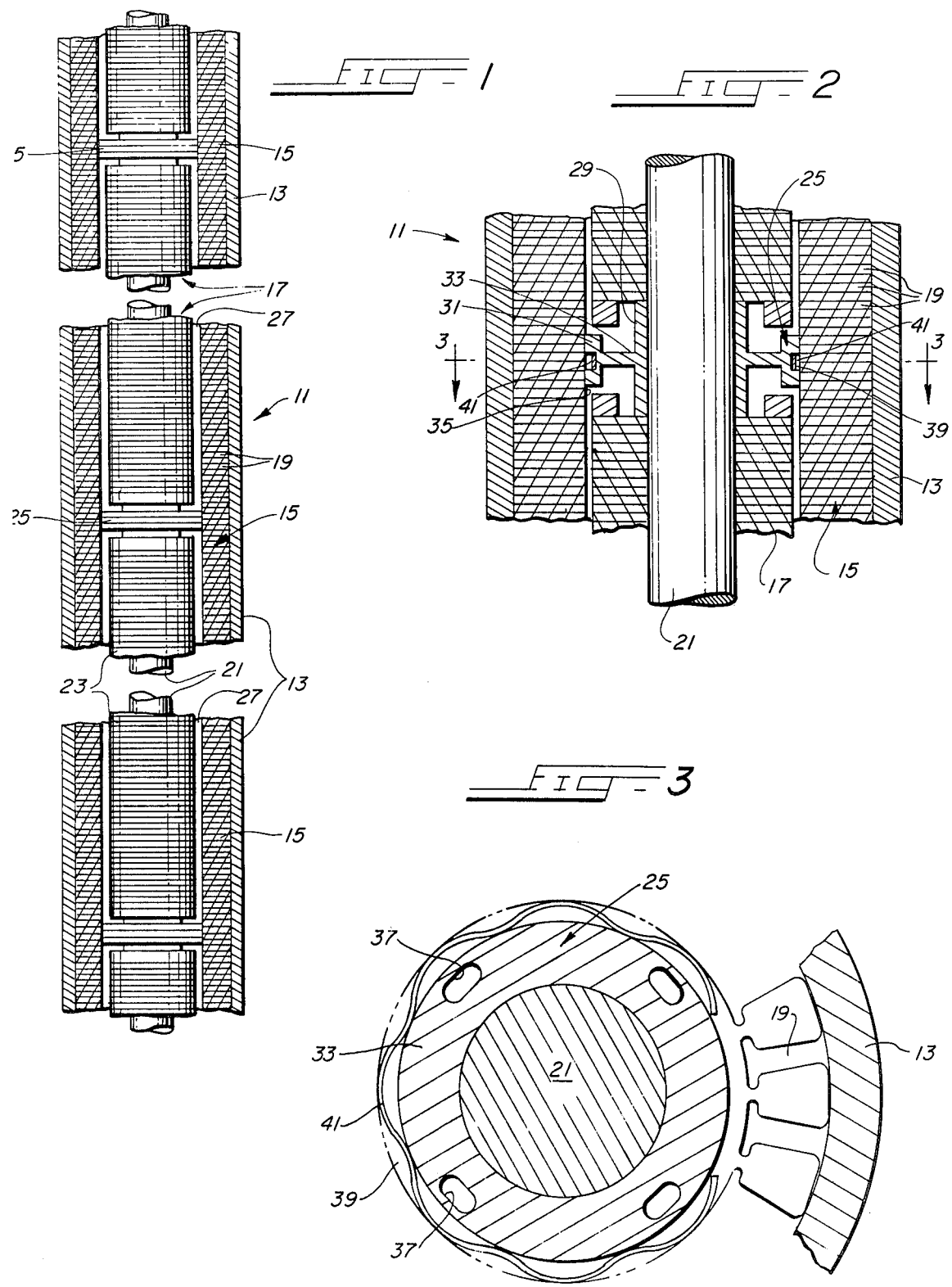

BEARING ARRANGEMENT FOR ELONGATED ELECTRIC MOTORS

BACKGROUND OF THE INVENTION

Submersible electric motors used to drive deep well pumps are usually extremely long relative to their diameter and it has been found necessary to support the rotor shaft of such motors at regular intervals with bearing means. Motors of this type are constructed of a plurality of annular laminations of magnetic material which forms the stator and a plurality of segmented rotor sections connected to the shaft and received in the stator. The bearing means are located between adjacent rotor segments and may comprise sleeve portions surrounding the shaft and connected journals which engage the inner surface of the stator. These journals are preferably stationary with respect to the stator.

An immediate problem which arises with the use of such bearing means is the possibility of rotation of the stationary bearing element due to the effects of the rotating magnetic field produced by the motor stator. Such rotation causes overheating of the bearing which in turn adds substantial heat to the entire motor assembly and results in significant loss of operating efficiency. Additionally, such rotation damages the motor stator and may require premature maintenance or replacement of motor parts.

The problem has been recognized; many attempts have been made to solve the problem. One method is to provide a stator core which is discontinuous in the areas which contact the stationary bearing journal. This is accomplished by including groups of non-magnetic laminations in the motor stator assembly. In this manner, the magnetic field was interrupted at the bearing locations and rotation of the stationary bearing was prevented.

Other attempts to solve the problem have been made by constructing bearings of non-magnetic materials; however, to be successful, such material must also resist the inducement of internal eddy currents. Even these materials have a tendency to rotate in a magnetic field. Thus few materials can satisfy the requirements.

THE INVENTION

According to this invention, the bearing means in an elongated electric motor constructed with a stator of magnetic laminations are each provided with an annular, peripheral groove and a spring means is positioned in each groove in juxtaposition to the adjacent stator laminations. Each spring is a corrugated, metallic strip to frictionally engage portions of the bearing means and the adjacent stator laminations. When such a motor is energized, the motor shaft and the attached rotor sections rotate within the bearing means which, even while being positioned in a magnetic field, do not rotate and cause the problems previously encountered in such motors, as set out in the background portion of this specification. The spring permits axial movement of the shaft if elongation occurs due to unequal heating of the shaft and stator.

THE DRAWINGS

FIG. 1 is a fragmentary view of an elongated electric motor, partly in section, illustrating this invention;

FIG. 2 is an enlarged view of a portion of FIG. 1 with one of the bearing means in section; and FIG. 3 is a view taken on line 3—3 of FIG. 2 looking in the direction of the arrows.

DETAILED DESCRIPTION

Looking now at the drawing, there is illustrated an elongated electric motor 11 which comprises a housing 13, a stator 15 and a rotor 17. The stator 15 is composed of a plurality of laminations 19 of magnetic material. The stator 19 is fixed to the housing 13.

A rotatable shaft 21 extends beyond the ends (not shown) of the stator 15 and may be provided with conventional radial and thrust bearings (also not shown). The shaft is concentric with the housing 13 and the stator 15, and provides a mounting for the rotor 17.

A series of rotor sections 23 surround the shaft 21 at axial intervals and are separated to allow sufficient space for an alternate series of bearing means 25. The rotor sections additionally have an outer diameter smaller than the inner dimension of the stator 15 establishing an air gap 27 to allow axial flow of coolant from a source (not shown). The length of the shaft 21 is determined by the number of rotor sections required to provide a motor of adequate horsepower for the application in which it is to be used. Motors having a length of about 30 feet are not uncommon. The number of bearing means 25 and their spacing is a function of the mechanical strength of the shaft 21, the air gap tolerance and other particular design parameters. The alternating rotor bearing combination extends the length of the stator 15.

As is best seen in FIGS. 2 and 3, each of the bearing means 25 comprises inner sleeve and outer ring portions 29 and 31, respectively, joined by an annular web portion 33. The inner sleeve portion 29 is a bushing and surrounds the shaft 21 and preferably permits the shaft to rotate therein. The outer ring portion is of generally smaller length and abuts the inner surface 35 of the stator 15. Openings 37 in the web portion 33 permit the passage of the coolant before described.

Each outer ring portion 31 is formed with a groove 39 about its periphery and a corrugated spring member 41 is positioned in each groove 39, bearing both on the bottom of the groove and thus on the bearing means and also on the surface 35 of the stator 15.

The bearing means 25 is constructed of non-magnetic material because even non-magnetic metallic materials have a tendency to rotate when they are placed under the influence of a rotating magnetic field. The spring member 41 functions to retain the bearing means against rotation relative to the stator 15 even in a magnetic field.

An alternative bearing means can be used in which a separate bushing, such as one of brass and the like, is positioned between the inner ring portion of the bearing means and the shaft without departing from the spirit of this invention. The use of a non-magnetic bushing of this nature is shown in U.S. Pat. No. 3,506,861, granted to C. A. Boyd. In any event the outer ring member is provided with a groove to receive a spring means as previously described.

We claim:

1. An elongated electric motor comprising:
   a housing;
   a homogeneous stator composed of a plurality of generally annular magnetic laminations, said stator being mounted in said housing;
   a shaft rotatably mounted within said stator;

a generally cylindrical rotor composed of spaced apart rotor sections mounted on said shaft;

a plurality of spaced bearing means between adjacent rotor sections and supporting said shaft;

each of said bearing means having a ring portion engaging said stator;

each said ring portion having a groove therein intermediate its ends, the open portion of which faces said stator; and elongated spring means in said groove in contact with said stator and said ring portion preventing rotation of said bearing means with said shaft because of the magnetic field of the stator.

2. A motor as in claim 1 in which said bearing means comprises a sleeve portion surrounding said shaft and said ring portion engaging said stator, said sleeve portion and said ring portion being connected by a radial web.

3. A motor as in claim 2 in which said spring member is a corrugated metal member.

4. A motor as in claim 2 in which said spring member permits shaft elongation due to heat differential between said shaft and said stator.

5. A motor as in claim 1 wherein said bearing means comprises a non-magnetic material.

* * * * *